(12) United States Patent
Frolikov

(10) Patent No.: US 10,678,458 B2
(45) Date of Patent: Jun. 9, 2020

(54) DATA STORAGE DEVICE IDLE TIME PROCESSING

(71) Applicant: Micron Technology, Inc., Boise, ID (US)

(72) Inventor: Alex Frolikov, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 15/893,249

(22) Filed: Feb. 9, 2018

(65) Prior Publication Data

US 2019/0250838 A1 Aug. 15, 2019

(51) Int. Cl.
G06F 3/06 (2006.01)
G06F 9/445 (2018.01)
G06F 8/65 (2018.01)
G06F 9/50 (2006.01)

(52) U.S. Cl.
CPC .......... *G06F 3/0634* (2013.01); *G06F 3/0604* (2013.01); *G06F 3/0652* (2013.01); *G06F 3/0659* (2013.01); *G06F 3/0673* (2013.01); *G06F 8/65* (2013.01); *G06F 9/44526* (2013.01); *G06F 9/5005* (2013.01)

(58) Field of Classification Search
CPC ...... G06F 9/44526; G06F 8/65; G06F 3/0673; G06F 3/0659; G06F 3/0652; G06F 3/0604; G06F 3/0634
USPC ......................................................... 711/103
See application file for complete search history.

(56) References Cited

U.S. PATENT DOCUMENTS

| 6,898,653 B2 | 5/2005 | Su et al. |
| 8,799,561 B2 | 8/2014 | Bux et al. |
| 8,904,072 B2 | 12/2014 | Lee |
| 9,268,499 B1 | 2/2016 | Wilkins et al. |
| 10,489,085 B2 | 11/2019 | Frolikov |
| 2006/0184718 A1* | 8/2006 | Sinclair ................. G06F 3/0608 711/103 |
| 2008/0040818 A1 | 2/2008 | Iima et al. |
| 2008/0052506 A1* | 2/2008 | Iima .................... G06F 11/1417 713/1 |
| 2011/0283046 A1* | 11/2011 | Koseki ................. G06F 3/061 711/103 |

(Continued)

OTHER PUBLICATIONS

"SDB:SSD Idle Time Garbage Collection support", https://en.opensuse.org/SDB:SSD_Idle_Time_Garbage_Collection_support, printed on Jan. 19, 2018.

(Continued)

*Primary Examiner* — Charles Rones
*Assistant Examiner* — Han V Doan
(74) *Attorney, Agent, or Firm* — Greenberg Traurig

(57) ABSTRACT

A computer system having a host coupled to a storage device via a peripheral component interconnect express bus. The host communicates with the storage device in accordance with a non-volatile memory host controller interface specification. The host provides a customized module containing instructions for performing the operations of a customized command. The host sends an idle time command to the storage device for execution at an idle time. In response to a determination that the storage device is in an idle state, the storage device executes the idle time command, during which the module may be used by the controller of the storage device.

17 Claims, 3 Drawing Sheets

(56) References Cited

U.S. PATENT DOCUMENTS

| | | | |
|---|---|---|---|
| 2014/0020083 A1 | 1/2014 | Fetik | |
| 2015/0186074 A1* | 7/2015 | Benisty | G06F 3/0659 |
| | | | 711/115 |
| 2016/0124740 A1* | 5/2016 | Choi | G06F 8/654 |
| | | | 717/168 |
| 2017/0123667 A1* | 5/2017 | Richter | G06F 3/0679 |
| 2018/0173461 A1* | 6/2018 | Carroll | G06F 3/0659 |
| 2018/0196602 A1* | 7/2018 | Shin | G06F 3/0604 |
| 2018/0336150 A1 | 11/2018 | Jinn et al. | |
| 2019/0265909 A1 | 8/2019 | Frolikov | |
| 2019/0361630 A1 | 11/2019 | Frolikov | |

OTHER PUBLICATIONS

"Write Amplification", Wikipedia, printed Feb. 22, 2018.
Latency-based Scheduling of Command Processing in Data Storage Devices, U.S. Appl. No. 15/908,261, filed Feb. 28, 2018, Alex Frolikov, dated Apr. 2, 2018.
International Search Report and Written Opinion, PCT/US2019/014765, dated May 3, 2019.

* cited by examiner

DATA STORAGE DEVICE IDLE TIME PROCESSING

FIELD OF THE TECHNOLOGY

At least some embodiments disclosed herein relate to computer storage devices in general and more particularly but not limited to solid state drives (SSDs).

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

DETAILED DESCRIPTION

A storage device, such as a solid state drive (SSD), has a controller that is typically programmed via firmware to perform computations required for accessing the storage media in the storage device, such as converting logical addresses, used by a host to specify data access locations, to physical addresses of storage elements in the storage device.

In at least one embodiment disclosed herein, a storage device is customizable to offer to its host the computing power of its controller as a computational resource and to provide computation services when the storage device is at least partially in an idle state.

For example, add-on modules configured for execution by the controller of the storage device can be loaded in the storage device to enable customized commands from its host. The host may send customized commands to the storage device to request the storage device to perform computations invoked by customized commands and programmed using the add-on modules. The storage device executes, at an idle time, the customized commands using the computing power of the controller of the storage device and/or the data already stored in the storage device. The computation results are stored in the storage device for retrieval by the host after the storage device reports the completion of the execution of the customized commands. Thus, the storage device not only stores data for the host but also performs customizable data processing tasks according to the instructions, programs, and/or applications specified by the host.

Figure 1:
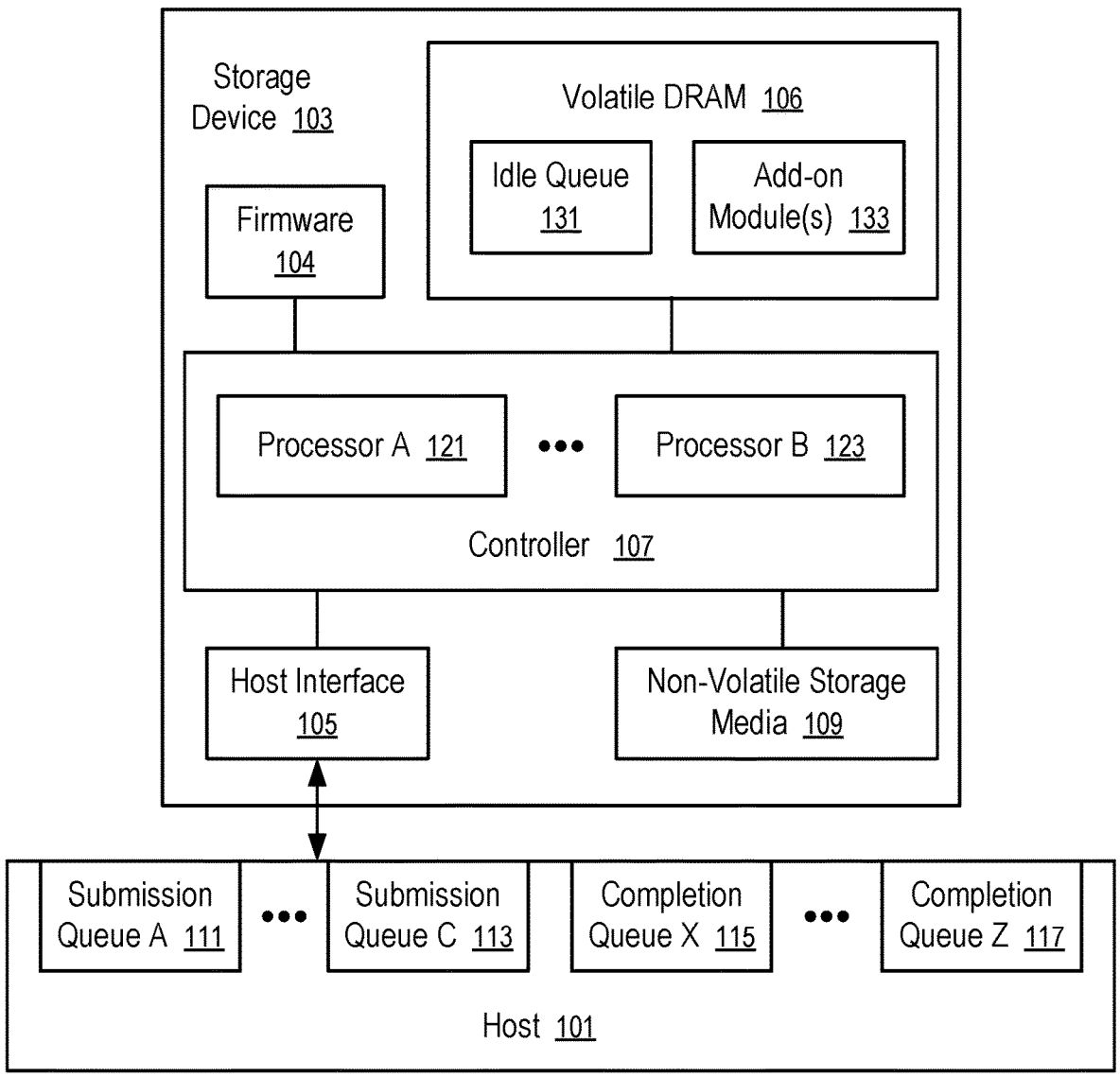
FIG. 1 shows a computer system configured to perform idle time processing in a storage device according to at some embodiments disclosed herein.

FIG. 1 shows a computer system configured to perform idle time processing in a storage device according to at some embodiments disclosed herein.

The computer system of FIG. 1 includes a storage device (103) attached to a host (101). The host (101) communicates add-on modules (133) to the storage device (103) and sends requests/commands implemented via, or programmed/defined by, the add-on modules (133) using submission queues (111, ..., 113). The storage device (103) places the customized requests/commands in the idle queue (131) for execution at an idle time and executes other requests/commands before the idle time. When the storage device (103) has idle resources for the execution of the requests/commands in the idle queue (131), the storage device (103) loads the add-on module(s) (133), runs the requests/commands in the idle queue (131), and provides a response to a completion queue (115, ..., or 117) associated with a submission queue (111, ..., or 113) from which the requests/commands are received.

The add-on modules (133) can be provided as part of the firmware (104). During the update of the firmware (104), the add-on modules (133) are communicated to the storage device (103) and stored in the non-volatile storage media (109) (e.g., as part of the firmware (104)).

Alternatively, or in combination, the add-on modules (133) can be provided as data stored in the non-volatile storage media (109) via input/output requests. Since the requests/commands implemented using the add-on modules (133) are executed from the idle queue (131) during an idle time, the host (101) is allowed to provide the add-on modules (133) after submitting the requests/commands.

The firmware (104) may include an operating system (e.g., implemented via a version of Linux kernel, or Chromium OS). Optionally, the operating system included in the firmware (104) is an open source computer operation system that allows users of the computer system, or a third party, to develop applications, extensions, and/or apps as add-no modules (133).

The firmware (104) may include an application programming interface (API) that supports the development of applications, extensions, and/or apps using a computer programming language, such as a scripting language.

In one implementation, the storage device (103) has a controller (107) having multiple processors (121, ..., 123). One of the processors (121, ..., 123) is configured to run the operating system to process customized commands.

For example, the processor (121) may run an operating system that recognizes and queues customized commands in the idle queue (131), and manages the add-on modules (133). When the processor (121) is free of tasks for standard input/output operations (e.g., commands defined in the admin command set and in the NVM command set in an NVMe standard), the operating system loads the add-on modules (133) according to the needs of the requests/commands in the idle queue (131). When there are other input/output requests/commands waiting in any of the submission queues (111, ..., 113), the operating system may pause the execution of the customized commands and/or the processing of commands from the idle queue (131) until the processor (121) is substantially idling again.

Further, the processor (121) may monitor the workloads of the other processors (e.g., 123) and dispatch requests/commands from the idle queue (131) to idling processors (e.g., 123).

In some implementations, an idle queue is implemented on the host (101) as a dedicated submission queue (e.g., 113) of commands to be processed at the idle time of the storage device (103). The commands placed in the submission queue (e.g., 113) may not be limited to customized commands that use the add-on modules (133). For example, a standard read or write command may be placed in the submission queue (e.g., 113) for execution at an idle time.

For example, a submission queue (113) is configured as a queue of commands for processing at the idle time of the storage device (103). The controller (107) of the storage device (103) does not fetch requests/commands from the submission queue (113) until at least one of the processors (121, ..., 123) is in an idle state. The controller (107) of the storage device (103) fetches commands from the other submission queues (e.g., 113) until they are empty and the execution of the fetched commands/requests is completed. Further, the controller (107) may execute system idle tasks, such as Idle Time Garbage Collection in solid state drives, before entering an idle state.

For example, an add-on module (133) can be programmed to perform machine learning using the data stored in the non-volatile storage media (109).

For example, an add-on module (133) can be programmed to apply a filter to the data stored in the non-volatile storage media (109) to generate filtered data.

For example, an add-on module (133) can be programmed to convert the data stored in the non-volatile storage media (109) from one format to another.

For example, an add-on module (133) can be programmed to index and/or organize the data stored in the non-volatile storage media (109).

In some instances, when the non-volatile storage media (109) is shared by a plurality of accounts, the computer system may improve data security by creating multiple namespaces. Each account is assigned to access one or more namespaces for exclusive use by the account; and the data access made in the account is addressed using logical addresses defined in a namespace. The execution of the add-on module(s) (133) limits data access within the respective namespace(s) of the account from which the request/command in the idle queue (131) are received. The storage device (103) translates the logical addresses defined in the namespace(s) of the account to physical addresses in the non-volatile storage media (109).

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storage spaces. Different portions of a storage device (103) can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

The host (101) of the storage device (103) may send a request to the storage device (103) for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

A block by block namespace map can be used in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes.

For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

After a block by block namespace map translates LBA addresses defined in allocated namespaces to LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Further details and examples of block by block namespace mapping, linking namespaces and accounts, and secure data for each account via linking namespaces and crypto keys can be found in U.S. patent application Ser. No. 15/876,066, filed Jan. 19, 2018 and entitled "Management of Storage Resources Allocated from Non-volatile Memory Devices to Users", the entire disclosure of which is hereby incorporated herein by reference.

The host (101) of FIG. 1 communicates with the storage device (103) via a communication channel having a predetermined protocol. In general, the host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The controller (107) of the storage device (103) runs firmware (104) to perform operations responsive to the communications from the host (101). Firmware in general is a type of computer program that provides control, monitoring and data manipulation of engineered computing devices.

In general, the non-volatile storage media (109) of the storage device (103) can be implemented as memory cells in an integrated circuit, or magnetic material coated on rigid disks. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or the add-on modules (133) organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104).

In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

Optionally, the storage device (103) has a register that stores a crypto key of the namespace during data access performed in the namespace and/or in the account.

In at least some embodiments, the host (101) and the storage device (103) communicate with each other via message queues. For example, a submission queue can be used by the host (101) to submit requests to the storage device (103); and a completion queue can be used by the host (101) to receive responses from the storage device (103). For example, a version of NVMe (e.g., Non-Volatile Memory Host Controller Interface Specification 1.2) specifies the use of a circular buffer with a fixed slot size for a submission queue or a completion queue.

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage device (103), commands to write data into the storage device (103), commands to compare data in the storage device (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the controller (107) of the storage device (103) fetch the commands/requests from a submission queue according to the order in which the commands are placed in the submission queue. However, the NVMe allows the controller (107) to execute the fetched commands in any order.

In at least some embodiments disclosed herein, when a submission queue has a customized command (e.g., not a standard command defined in NVMe), the controller (107) places the customized command in the idle queue (131) for execution during idle time.

For example, the storage device (103) may process all of the I/O submission queues configured for the storage device (103) according to a round robin scheme, where the storage device (103) executes one command from a queue, or up to a predetermined number of commands, and then processes the next queue according to a predetermined queue order. After the submission queues (111, . . . , 113) are empty, the controller (107) processes the idle queue (131).

For example, the storage device (103) may randomly select a queue to execute a command (or up to a predetermined number of commands) and then randomly select the next queue for execution of a command (or up to the same predetermined number of commands). After the submission queues (111, . . . , 113) are empty, the controller (107) processes the idle queue (131).

For example, the storage device (103) may randomly select a queue for the execution of a random number of commands and then randomly select the next queue for execution of a random number of commands. After the submission queues (111, . . . , 113) are empty, the controller (107) processes the idle queue (131).

For example, the storage device (103) may randomly select a queue for the execution of a set of related commands in the queue and then randomly select the next queue for execution of a set of related commands. After the submission queues (111, . . . , 113) are empty, the controller (107) processes the idle queue (131).

Alternatively, or in combination, one or more submission queues (e.g., 111) are configured to submit commands for execution at idle time. The controller (107) completes the processing of other queues to enter an idle state in order to further processing the submission queues (e.g., 111) that is configured to submit commands for execution at idle time.

Figure 2:
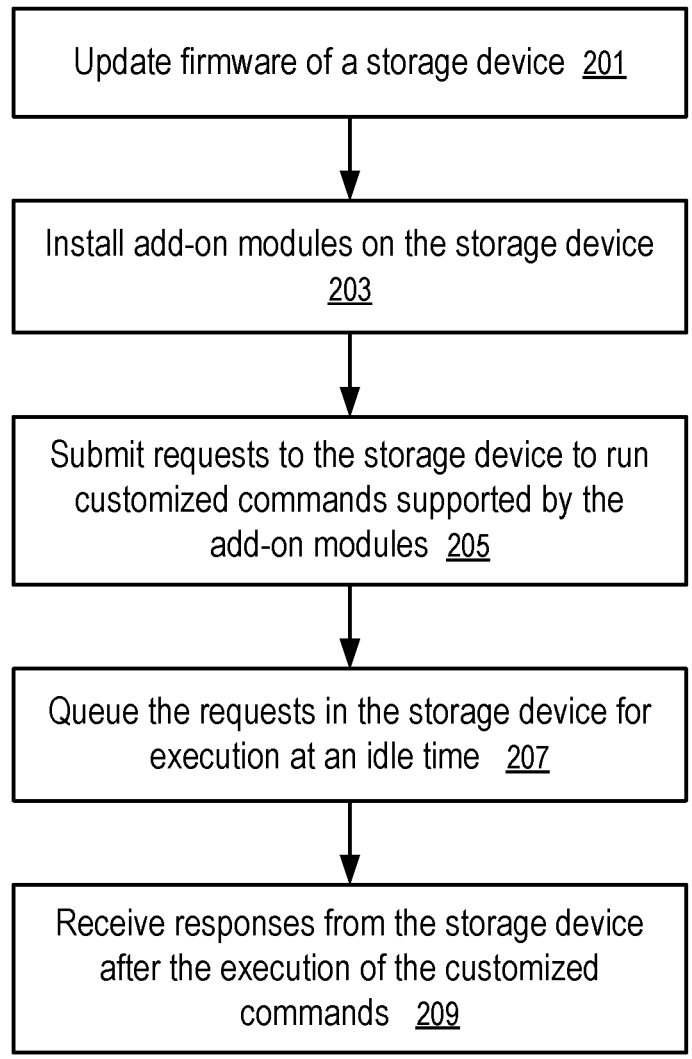
FIG. 2 shows a method to perform idle time processing.

FIG. 2 shows a method to perform idle time processing. For example, the method of FIG. 2 can be implemented in a computer system of FIG. 1.

The method of FIG. 2 includes: updating (201) firmware (104) of a storage device (103); installing (203) add-on modules (133) on the storage device (103) (e.g., via a firmware update and/or storing the module as data in the storage device (103)); submitting (205) (e.g., via submission queues (111, . . . , 113) requests to the storage device (103) to run customized commands that are supported by or programmed by the add-on modules (133); queuing (207) the requests in the storage device (103) (e.g., in the idle queue (131)) for execution at an idle time; and receiving (209) (e.g., via completion queues (115, . . . , 117) responses from the storage device (103) after the execution of the customized commands.

Figure 3:
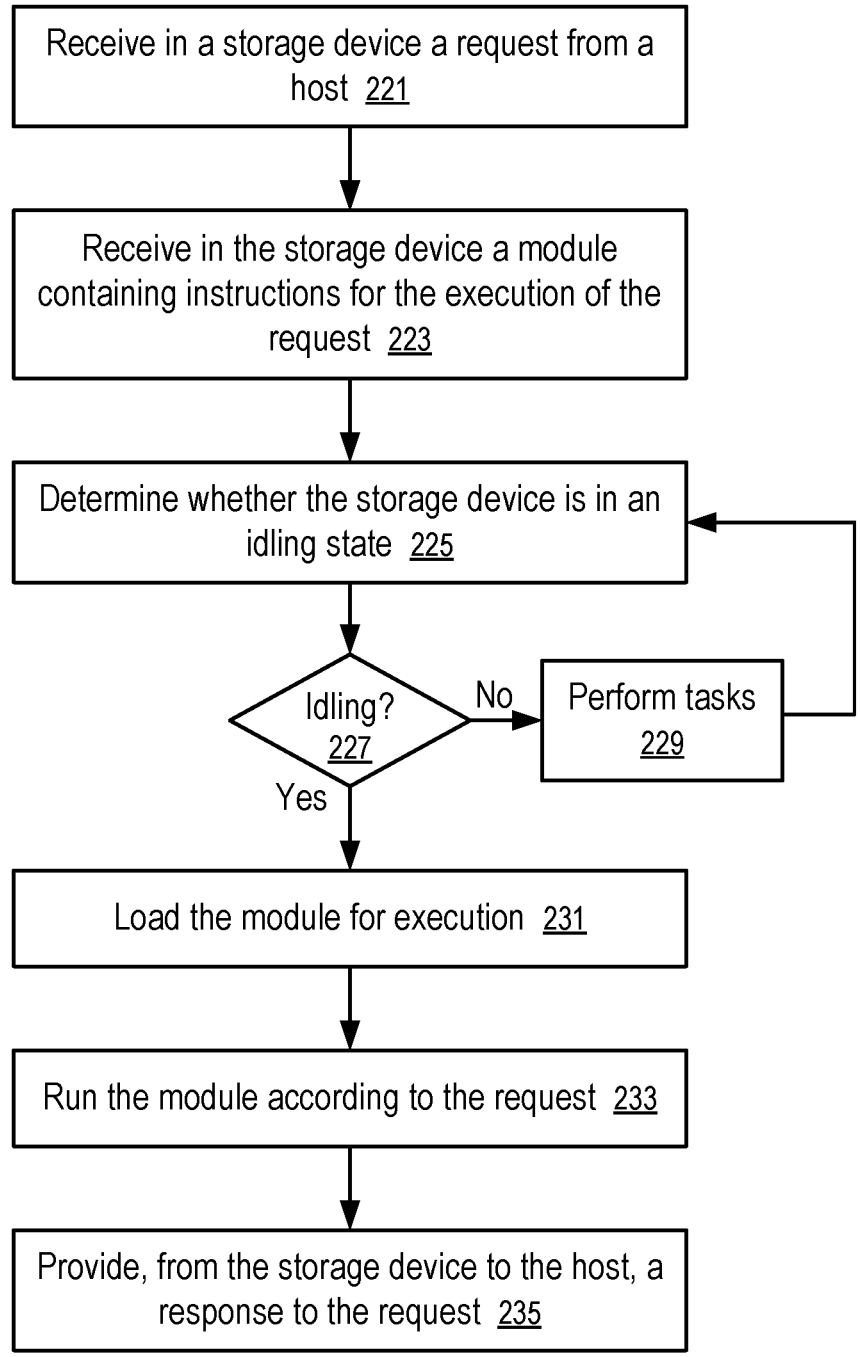
FIG. 3 shows another method to perform idle time processing.

FIG. 3 shows another method to perform idle time processing. For example, the method of FIG. 3 can be implemented in a computer system of FIG. 1.

The method of FIG. 3 includes: receiving (221) in a storage device (103) a request from a host (101); receiving (223) in the storage device (103) a module (133) containing instructions for the execution of the request; and determining (225) whether the storage device (103) is in an idling state (e.g., having completed non-customized commands and/or having completed idle time garbage collection)

If it is determined (227) that the storage device (103) is idling, the method of FIG. 3 further includes performing (229) tasks and further determining (227) whether the storage device (103) is idling; otherwise, the method of FIG. 3 further includes: loading (231) the module (133) for execution; running (233) the module (133) according to the request; and providing (235), from the storage device (103) to the host (101), a response to the request.

For example, a computer system (e.g., as illustrated in FIG. 1) has: a host (101); and a storage device (103) that is coupled to the host (101) via a communication bus (e.g., a peripheral component interconnect express bus). The storage device (103) has: a host interface (105) in communication with the host (101); a controller (107); non-volatile storage media (109); and firmware (104) containing instructions executable by the controller (107).

The host (101) transmits, to the storage device (103), a module (133) and a request to run the module (133). The module (133) and the request may be transmitted together in one submission, or separately. In response, the storage device (103) waits until storage device (103) is in an idle state in order to run the module (133) in accordance with the request.

The host (101) may communicate with the storage device (103) in accordance with a non-volatile memory host controller interface specification.

As an example, the storage device (103) is a solid state drive, where the command or request to run the module (133) is scheduled, by the controller (107) executing the firmware (103), for execution after the solid state drive completes idle time garbage collection.

The controller (107) of the storage device (103) may include a plurality of processors (121, ..., 123), which may be separate microprocessors, or different processing cores packaged in a microprocessor. The firmware (104) may include an operating system running on one of the processors (121, ..., 123) to recognize and schedule, in the idle queue (131), the execution of customized commands received via the submission queues (111, ..., 113). The operating system manages the loading and unloading of the add-on modules (133).

For example, the operating system running on one of the processors (121, ..., 123) configures an idle queue (131) in the volatile DRAM (106) of the storage device (103) to hold customized requests/commands fetched from the submission queues (111, ..., 113) and schedules their execution at a time when the storage device (103) is in the idle state. Preferably, the idle state is reached after the submission queues (111, ..., 113) are all empty, the requests/commands fetched from the submission queues (111, ..., 113), other than those held in the idle queue (131), have all be completed, and/or routine idle processing tasks, such as idle time garbage collection for SSD, have all been completed.

The module (133) containing the instructions for performing operations a customized command can be communicated from the host (101) to the storage device (103) in various ways. For example, the module (133) can be communicated to the storage device (103) as a firmware update submitted via an admin submission queue, communicated to the storage device (103) as part of the request/command sent via the I/O submission queue, or communicated to the storage device (103) as a request/command to store data in the non-volatile storage media (109) via an I/O submission queue where the stored data includes the module (133). The I/O request/command to store the module (133) in the non-volatile storage media (109) can be separate from the I/O request/command that uses of the module (133) and can be submitted using the same queue as, or another queue different from, the I/O submission queue that is used to submit the I/O request/command that uses of the module (133).

As an alternative to maintaining the idle queue (131) in the storage device, or in combination, a separate submission queue (e.g., 113) can be configured to submit idle time requests/commands, which may or may not use add-on modules (133). The firmware (104) is configured to cause the controller (107) to fetch, at an idle time, commands from the submission queue (e.g., 113) identified for idle time requests/commands. The idle time is identified after the other submission queues (e.g., 111, ...) and/or the idle queue (131) are empty, after the previously fetched requests/commands have been completed, and/or after the routine idle time tasks have been completed.

Typically, the add-on module (133) is programmed to run by the controller (107) of the storage device (103) using the data stored in the non-volatile storage media (109) without a need to communicate with the host (101) during the execution of the add-on module (133). The execution of a request/command in the idle queue (131) and/or a submission queue (e.g., 113) for idle time execution may use one or more modules in the firmware (104) and/or in the operating system running in one of the processors (121, ..., 123). The processing result may be stored back in the non-volatile storage device (109) and/or reported to the host via a message placed in a completion queue (115, ..., or 117).

A non-transitory computer storage medium can be used to store instructions of the firmware (104) and/or the add-on modules (133). When the instructions are executed by the controller (107) of the computer storage device (103), the instructions cause the controller (107) to perform a method discussed above.

In the present disclosure, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer system, comprising:
   a host, comprising a plurality of submission queues to communicate requests to a storage device, and the plurality of submission queues comprising first queues and a second queue identified to the storage device for submission of requests for execution during idle times of the storage device; and
   the storage device having:
      a host interface in communication with the host;
      a controller;
      non-volatile storage media; and
      firmware containing instructions executable by the controller; and
   wherein the host transmits, to the storage device, a module and a request to run the module;
   wherein the storage device receives, from the host, the module and the request, and runs the module in accordance with the request in response to a determination that the storage device is in an idle state;
   wherein the firmware configures the controller to fetch commands from the second queue after the first queues are empty and
   after completing idle time garbage collection; and
   wherein the idle time garbage collection executes before the storage device is in the idle state.

2. The computer system of claim 1, further comprising:
   a communication bus coupled between the host and the storage device.

3. The computer system of claim 2, wherein the communication bus is a peripheral component interconnect express bus.

4. The computer system of claim 3, wherein the host communicates with the storage device in accordance with a non-volatile memory host controller interface specification.

5. The computer system of claim 4, wherein the storage device is a solid state drive.

6. The computer system of claim 5, wherein the storage device is determined to be in the idle state at least after completing idle time garbage collection in the solid state drive.

7. The computer system of claim 4, wherein the controller includes a plurality of processors; the firmware includes an operating system running on one of the processors.

8. The computer system of claim 7, wherein the operating system configures an idle queue in a memory of the storage device hold the request and schedules execution of the request when the storage device is in the idle state.

9. The computer system of claim 8, wherein the host has a plurality of submission queues to communicate requests to the storage device; and the storage device is determined to be in the idle state at least after the submission queues are empty.

10. The computer system of claim 4, wherein the module is communicated from the host to the storage device via a firmware update.

11. The computer system of claim 4, wherein the module is communicated from the host to the storage device as part of the request.

12. The computer system of claim 4, wherein the module is communicated from the host to the storage device as part of data stored in the non-volatile storage media.

13. The computer system of claim 4, wherein the firmware configures the controller to fetch commands from the second queue after completing of execution of commands from the first queues.

14. A method implemented in a computer system, the method comprising:
   transmitting, from a host to a storage device, a module, wherein the storage device having a host interface in communication with the host, a controller, non-volatile storage media, and firmware containing instructions executable by the controller;
   communicating, by a plurality of submission queues of the host, requests to the storage device, the plurality of submission queues comprising first queues and a second queue identified to the storage device for submission of requests for execution during idle times of the storage device;
   transmitting, from the host to the storage device, a request to run the module;
   receiving, in the storage device from the host, the module;
   receiving in the storage device from the host, the request;
   determining, by the controller of the storage device, whether the storage device is in an idle state;

in response to a determination that the storage device is in the idle state, running the module in accordance with the request;

configuring, by the firmware, the controller to fetch commands from the second queue after the first queues are empty and after completing idle time garbage collection, wherein the idle time garbage collection executes before the storage device is in the idle state.

15. The method of claim 14, wherein the module and the request are communicated over a peripheral component interconnect express bus coupled between the host and the storage device.

16. The method of claim 15, wherein running the module includes processing data stored in the non-volatile storage media without communication with the host, storing results of the processing in the non-volatile storage media, providing a completion message to the host after running the module.

17. A non-transitory computer storage medium storing instructions which, when executed by a computer system, cause the computer system to perform a method, the method comprising:

storing, by a host in a storage device, a module defining operations to be performed by a customized command, wherein the storage device having a host interface in communication with the host, a controller, non-volatile storage media, and firmware containing instructions executable by the controller;

communicating, by a plurality of submission queues of the host, requests to the storage device, the plurality of submission queues including first queues and a second queue identified to the storage device for submission of requests for execution during idle times of the storage device;

submitting, from the host to the storage device, the customized command;

receiving in the storage device from the host, the customized command;

scheduling, by the controller executing the firmware, the customized command for execution at an idle state;

determining, by the controller of the storage device, whether the storage device is in the idle state;

in response to a determination that the storage device is in the idle state, loading the module to execute the customized command;

configuring, by the firmware, the controller to fetch commands from the second queue after the first queues are empty and after completing idle time garbage collection, wherein the idle time garbage collection executes before the storage device is in the idle state.

* * * * *